United States Patent [19]

Schwaiger et al.

[11] 4,370,145
[45] Jan. 25, 1983

[54] COPPER FORMAZAN COMPOUNDS, PROCESSES FOR THEIR PREPARATION AND THEIR USE AS DYESTUFFS

[75] Inventors: Günther Schwaiger; Ernst Hoyer, both of Frankfurt am Main, Fed. Rep. of Germany

[73] Assignee: Hoechst Aktiengesellschaft, Frankfurt am Main, Fed. Rep. of Germany

[21] Appl. No.: 324,871

[22] Filed: Nov. 25, 1981

Related U.S. Application Data

[63] Continuation of Ser. No. 204,916, Nov. 7, 1980, abandoned.

[30] Foreign Application Priority Data

Nov. 11, 1979 [DE] Fed. Rep. of Germany ....... 2945464
Sep. 20, 1980 [DE] Fed. Rep. of Germany ....... 3035562

[51] Int. Cl.³ ...................... C09B 62/50; C09B 50/00
[52] U.S. Cl. ................................ 8/549; 8/681; 8/686; 260/146 R; 260/149; 260/146 T
[58] Field of Search ............................ 8/549, 681, 686; 260/146 R, 146 T, 149

[56] References Cited

U.S. PATENT DOCUMENTS

2,662,075 12/1953 Brooks ................................ 260/149
3,068,219 12/1962 Beffa et al. ......................... 260/149
3,926,942 12/1975 Yelland ............................. 260/146 T
4,158,003 6/1979 Bitterlin et al. .................. 260/146 T
4,255,325 3/1981 Harms et al. ...................... 260/146 T

FOREIGN PATENT DOCUMENTS

2945493 5/1981 Fed. Rep. of Germany .
45-8183 3/1970 Japan .
1194504 6/1970 United Kingdom .

*Primary Examiner*—A. Lionel Clingman
*Attorney, Agent, or Firm*—Curtis, Morris & Safford

[57] ABSTRACT

New copper-complex formazan compounds of the general formula:

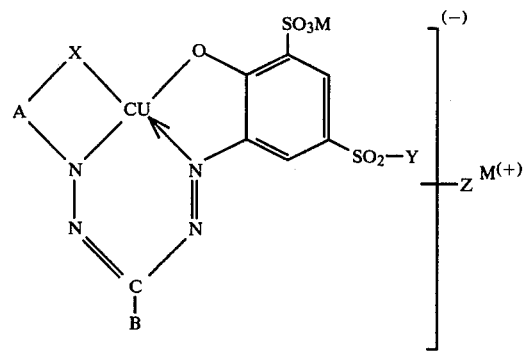

in which A is a phenylene or naphthylene radical which can be substituted by halogen, nitro, lower alkyl, lower alkoxy, lower alkylsulfonyl, phenylsulfonyl and optionally alkylated sulfonamide groups and can also be substituted by the radical Z, defined below, B is a straight-chain or branched-chain alkyl group or alkenyl group, which can be substituted by an optionally substituted phenyl radical, or is a phenyl or naphthyl radical, which can be substituted by halogen, lower alkyl, lower alkoxy and lower carbalkoxy, or is the radical or a furan, thiophene, pyrrole, imidazole, indole, pyrazole, pyridine, pyrimidine, quinoline or benzimidazole, it being possible for B likewise to be substituted by the group Z, defined below, Z denotes a group which confers solubility in water, such as the carboxyl group or sulfo group, one to three of which are bonded to A and/or B, Cu is a copper atom, X denotes an oxygen atom or a carbonyloxy group and is bonded to A in the ortho-position relative to the nitrogen atom, Y represents the vinyl or β-thiosulfatoethyl group and M denotes a hydrogen atom or the equivalent of a metal. The new copper-complex formazan compounds can be prepared in a manner which is in itself customary, for example by reacting an aromatic hydrazone compound of the general formula:

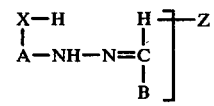

in which A, B, X and Z have the abovementioned meaning, with the diazonium compound of an aromatic amine of the general formula:

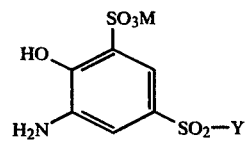

in which M and Y have the abovementioned meaning, and with an agent which donates copper. The new copper-complex formazan compounds have valuable dyestuff properties and are particularly suitable as fiber-reactive dye-stuff for dyeing for example, cellulose fiber materials, wool and synthetic polyamide fibers, on which they give strong reddish-tinged to greenish-tinged blue or clear blue dyeings with good fastness to light and wet processing.

4 Claims, No Drawings

COPPER FORMAZAN COMPOUNDS, PROCESSES FOR THEIR PREPARATION AND THEIR USE AS DYESTUFFS

This is a continuation of application Ser. No. 204,916, filed Nov. 7, 1980, now abandoned.

The present invention lies in the industrial field of copper-complex formazan dyestuffs and in the field of the use of such dyestuffs as fiber-reactive dyestuffs for dyeing, preferably, fiber materials.

Copper-complex formazan dyestuffs and nickel-complex formazan dyestuffs are known from the tabular Examples 14 and 15 in German Auslegeschrift No. 1,256,622, and also from German Auslegeschrift No. 1,719,083. However, the technological properties of these dyestuffs are to a certain extent deficient.

New copper formazan compounds which correspond to the general formula (1):

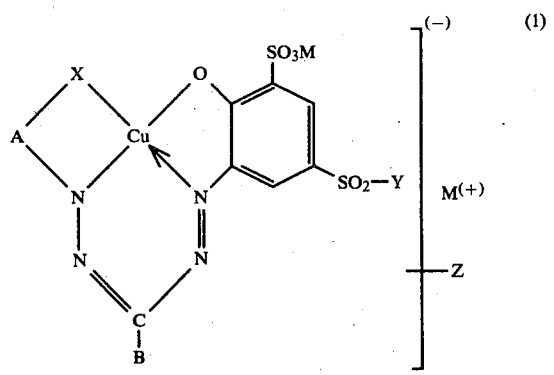

have been found. In this formula (1), the individual radicals have the following meaning: A can be substituted by Z, as defined below, and is a phenylene or naphthylene radical which can be substituted by substituents, preferably two and particularly preferably one substituent, from the group comprising halogen, such as fluorine, chlorine and bromine, nitro, alkyl with 1 to 5 C atoms, such as isopropyl, tert.-butyl, tert.-amyl and isobutyl, in particular methyl and ethyl, alkoxy with 1 to 4 C atoms, such as methoxy and ethoxy, alkylsulfonyl with 1 to 4 C atoms, such as methylsulfonyl and ethylsulfonyl, phenylsulfonyl, sulfamoyl and N-mono- and N,N-dialkyl-sulfamoyl with in each case 1 to 4 C atoms in the alkyl; B can be substituted by Z and is a straight-chain or branched alkyl group with 1 to 8 C atoms, such as the methyl, ethyl, isopropyl, n-butyl, sec.-butyl, tert.-butyl, n-heptyl or n-octyl group, or a straight-chain or branched alkenyl group with 2 to 8 C atoms, such as the allyl group, it being possible for these alkyl and alkenyl groups also to be substituted by the phenyl radical, which can again be substituted by substituents from the group comprising methyl, ethyl, methoxy, ethoxy, fluorine, chlorine, bromine and sulfamoyl, or B is a phenyl or naphthyl radical, which can be substituted by substituents, preferably 1 or 2 substituents, from the group comprising hydroxy, nitro, halogen, such as fluorine, bromine and chlorine, alkyl with 1 to 5 C atoms, preferably methyl and ethyl, alkoxy with 1 to 4 C atoms, preferably methoxy and ethoxy, and carbalkoxy with 1 to 4 C atoms in the alkyl radical, such as carbomethoxy and carbethoxy, or B is a furan, thiophene, pyrrole, imidazole, indole, pyrazole, pyridine, pyrimidine, quinoline or benzimidazole radical, it being possible for these heterocyclic radicals to be substituted, on the aromatic carbon atoms, by chlorine, phenyl, methoxy, ethoxy, methyl or ethyl and for the hydrogen atoms in the NH groups of these heterocyclic radicals to be replaced by methyl, ethyl or benzyl, or B is a hydrogen atom; Z is a group which confers solubility in water, preferably the sulfo, carboxy or phosphonic acid group, as a substituent on A and B, optionally in addition to the abovementioned substituents of A and B, the formazan molecule necessarily containing one, two or three such substituents Z which are bonded to an aromatic carbon atom or an aliphatic carbon atom of A and B, for example to an aromatic carbon atom also via a methylene or ethylene bridge, preferably to an aromatic nucleus; Cu is copper; X is an oxygen atom or a carbonyloxy group of the formula —CO—O—, which is bonded to A in the ortho-position relative to the nitrogen atom on A; and Y is the vinyl group or the β-thiosulfatoethyl group of the formula —S—SO₃M, in which M has the following meaning; M is a hydrogen atom or the equivalent of a metal, preferably of an alkali metal or of an alkaline earth metal, such as, in particular, of sodium or potassium or of calcium.

If two or three radicals Z are bonded to the molecule, these radicals can have different meanings. Compounds of the general formula (1) in which one or two radicals Z are bonded to the molecule are preferred.

If B is an abovementioned phenyl-substituted alkyl or alkenyl radical, it is preferably the benzyl or styryl radical.

The new compounds of the general formula (1) can exist in acid form. They are preferably in the form of their salts, in particular the abovementioned alkali metal salts and alkaline earth metal salts. They are used, preferably in the form of the alkali metal salts, for dyeing (in the general sense, including printing) materials containing hydroxy groups, amino groups or carbonamide groups.

Preferred compounds of the general formula (1) according to the invention are those in which A denotes a phenylene radical, which can be substituted by 1 or 2, preferably one, substituents from the group comprising chlorine, bromine, nitro, methyl, ethyl, methoxy, ethoxy, carbomethoxy, carbethoxy, sulfamoyl and N,N-dimethylsulfamoyl, B denotes a phenyl radical, which can be substituted by 1 or 2 substituents from the group comprising chlorine, methyl, ethyl, methoxy, ethoxy, carbomethoxy, carbethoxy and nitro, Z has the abovementioned meaning, and is preferably the sulfo group, and one or two radicals Z are bonded to the aromatic nuclei A and B as additional substituents, and M, X and Y have the abovementioned meanings. Particularly preferred compounds of the formula (1) are those in which A represents a phenylene radical, which can be substituted by a methyl, ethyl, methoxy or ethoxy group or a chlorine atom, B denotes a phenyl radical, which can be substituted by a methyl, ethyl, methoxy or ethoxy group or by a chlorine atom, Z represents the sulfo group and one or two radicals Z are bonded to A and/or B in the molecule, X represents the carbonyloxy radical and M and Y have the abovementioned meanings.

Particularly preferred compounds of the formula (1) are those in which X represents the carbonyloxy radical, A is a phenylene radical, which is substituted by the sulfo group Z, preferably in the m-position or p-position relative to the nitrogen atom, B denotes the phenyl radical, which can be substituted by a chlorine atom, which is preferably bonded in the 2-position or 4-position, and M and Y have the abovementioned meanings.

The present invention also relates to processes for the preparation of the compounds of the general formula (1) which are mentioned and defined above. The processes comprise reacting an aromatic hydrazone compound of the general formula (2):

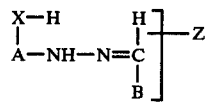
(2)

in which A, B, X and Z have the abovementioned meanings, with the diazonium compound of an aromatic amine of the formula (3):

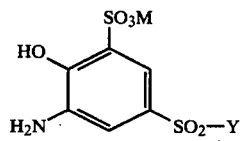
(3)

in which M and Y have the abovementioned meaning, and with an agent which donates copper. The customary procedure which is analogous to the known procedure for the preparation of metal complex formazen dyestuffs can be followed in this reaction. The process according to the invention is preferably carried out at a pH value of 4 to 7, in particular of 5 to 7, and at a temperature of between about 0° and 20° C.

The reactants can be added in any desired sequence, but the process can readily be carried out as a three-component reaction.

It has proved advantageous, after the coupling and metallization reaction, to adjust the reaction mixture to a pH value of less than 2, for example to a pH value of about 1, with a strong mineral acid, such as, for example, hydrochloric acid, and to keep the reaction mixture at this pH value for a further period of time, for example 30 minutes to two hours, at room temperature (15°–30° C.) in the case of the thiosulfatoethylsulfonyl compounds, and at room temperature (15°–30° C.) or elevated temperature (up to about 50° C.) in the case of the vinyl-sulfonyl compounds, if necessary with stirring. It should be ensured that the compound according to the invention which is formed is in solution. This is achieved partly by increasing the volume of solvent and partly by increasing the temperature up to about 50° C., if permitted. Various fastness properties, such as fastness to light, and the depth of color and purity of the color shade are considerably improved by this after-treatment. It is thus also unnecessary to dry the compounds at temperatures above 100° C., such as, for example, at about 150° C., which can lead to a reduction in the color yield of the copper-complex formazan compounds prepared.

Possible compounds which donate copper are, for example, the simple salts and the complex salts of copper, such as, for example, copper sulfate, copper chloride, copper acetate or copper carbonate, and the copper salts of salicylic acid or tartaric acid.

If the copper salts of mineral acids are used, it is expedient to carry out the reaction in the presence of an acid-buffering agent, such as, for example, an alkali metal hydroxide or carbonate or alkaline earth metal hydroxide or carbonate or an alkali metal salt of a lower alkanecarboxylic acid, such as acetic acid, or a basic alkali metal salt of phosphoric acid. These alkali metal compounds or alkaline earth metal compounds are, in particular, the sodium, potassium and calcium compounds, and preferably, for example, sodium hydroxide, potassium hydroxide, calcium hydroxide, sodium carbonate and potassium carbonate, calcium carbonate, sodium bicarbonate, sodium acetate, disodium hydrogen phosphate and trisodium phosphate.

The agent which donates copper is used in equimolar amounts, so that one copper atom is donated per one molecule of the compound to be formed, of the formula (1). The metallization usually already goes to completion at room temperature.

The copper-complex formazan compounds of the general formula (1) can be prepared, for example, by a procedure in which the hydrazone compounds of the general formula (2) are dissolved in water at room temperature with an alkali, such as sodium hydroxide solution or sodium carbonate; the pH value is preferably kept at 6 to 7. The diazonium salt solution of the amine of the general formula (3) is then added, the pH value of the reaction solution on the one hand not being allowed to be alkaline, in the case of the thiosulfatoethylsulfonyl compounds, or too highly alkaline (such as, advantageously, not greater than pH 8.5), in the case of the vinylsulfonyl compounds, and, on the other hand, not being allowed to be too highly acid (such as, advantageously, not less than pH 3), firstly in order not to damage the diazo group or thiosulfatoethylsulfonyl or vinylsulfonyl group in the alkaline range, and secondly in order to avoid precipitation of the hydrazone and hence a heterogeneous reaction in the acid range. The reaction is preferably carried out at a pH value of between 4 and 7, in particular at 5 to 7. The reaction temperature should expediently as far as possible not exceed 20° C., advantageously 15° C. At the same time, that is to say together with or after the addition of the diazonium compound, the equimolar amount of the agent which donates copper is added, for example in the form of copper sulfate in aqueous solution. The metallization reaction is also advantageously carried out at a pH value of 4 to 7, in particular 5 to 7. The metallization reaction and coupling reaction can proceed side by side. The metallization reaction proceeds relatively rapidly. As mentioned above, before the metal complex formazan compound prepared is isolated, it is advantageous to acidify the reaction solution to a pH value of about 1 with, for example, concentrated hydrochloric acid or sulfuric acid and to stir the mixture at room temperature for about one hour; it is then adjusted to a pH value of 5 to 6 and the metal complex formazan compound, according to the invention, which has been prepared is isolated in the customary manner, for example by salting out by means of an electrolyte, such as sodium chloride or potassium chloride. If appropriate, the compound can also be isolated by evaporating the solution, such as, for example, by spray-drying.

However, the compounds according to the invention can also be prepared by a procedure which is the same as that described above, but instead of the amine of the general formula (3), the corresponding 4-($\beta$-sulfatoethylsulfonyl)-2-amino-phenol-6-sulfonic acid or the corresponding 4-($\beta$-hydroxyethylsulfonyl)-2-amino-phenol-6-sulfonic acid is employed. The metal complex formazan compound thus obtained then contains the β-hydroxy- or β-sulfato-ethylsulfonyl group instead of the vinylsulfonyl group in the compounds of the formula (1) according to the invention. The β-hydroxyethylsulfonyl compound can be converted into the sulfato compound in a manner which is in itself customary using a sulfating agent, such as sulfuric acid, and preferably with amidosulfonic acid or chlorosulfonic acid in the presence of pyridine or a homolog of pyridine. The metal complex formazan compound with the β-sulfatoethylsulfonyl group is then converted into its vinylsulfonyl derivative in a manner which is in itself customary for this reaction, in alkaline-aqueous solution at a pH value of between 8 and 13, for example by means of sodium hydroxide solution or sodium carbonate or the corresponding potassium or calcium compounds, and in some cases at elevated temperature, for example at about 40° to 60° C. If, for example, sodium hydroxide solution is employed, the reaction is preferably carried out at a pH value of 11 to 13 and at 5°-25° C., and if, for example, sodium carbonate is used, the reaction is preferably carried out at a pH value of 8.5 to 10 and at 50°-55° C. These conditions also apply if, instead of the amine of the formula (3), the corresponding 4-(β-sulfatoethylsulfonyl)-2-aminophenol-6-sulfonic acid compound is employed, since the β-sulfatoethylsulfonyl group is converted into the vinylsulfonyl group under these conditions.

Furthermore, the thiosulfatoethylsulfonyl compounds of the general formula (1) according to the invention can also be prepared by using the vinylsulfonylmetal complex formazan compounds according to the invention as the starting materials and reacting these, by a procedure analogous to known procedures, with a salt of thiosulfuric acid, such as, for example, sodium thiosulfate, advantageously in excess, preferably in an excess of 20 to 50 mole %, in aqueous, weakly acid solution, advantageously at a pH value of between 5 and 6.8, in particular at 5.7 to 6.2, and at elevated temperature, such as, for example, 30° to 80° C., in particular 60° to 75° C.

However, the initially mentioned preparation using the aromatic amine of the general formula (3) is the more advantageous one.

If 4-(β-hydroxyethylsulfonyl)-2-amino-phenol-6-sulfonic acid is used as the starting material in the process variant for the preparation of the compounds of the general formula (1), the reaction to give the metal complex formazan compounds can also be carried out at a pH value of between 4 and 12; however, the pH value should be adjusted to between 4 and 8 for the metallization.

The hydrazone compounds of the general formula (2) used as starting compounds are obtained from the corresponding phenylhydrazines and naphthylhydrazines of the general formula H—X—A—NH—NH$_2$ (in which A and X have the abovementioned meanings)—which can be prepared in a manner which is in itself customary and known, for example from the corresponding diazonium compounds with salts of sulfurous acid, the intermediate N-sulfonic acids being hydrolyzed with mineral acids—preferably without intermediate isolation thereof, by reaction with the aldehyde of the general formula B—CHO (in which B has the abovementioned meaning), it being necessary to choose the hydrazines and aldehydes such that they contain, in total, one, two or three groups Z, defined above and bonded to A and/or B.

Aldehydes which correspond to the formula B—CHO, in which B has the abovementioned meaning, it also being possible for B to be substituted by Z, and which are used as starting compounds for the preparation of the hydrazones of the general formula (2) are, for example, benzaldehyde, 2-, 3- or 4-methyl-benzaldehyde, 4-methylbenzaldehyde-3-sulfonic acid, 2-, 3- or 4-methoxybenzaldehyde, 4-methoxy-3-chloro-benzaldehyde, 3-nitrobenzaldehyde, 2-hydroxy-benzaldehyde, 2- or 4-chlorobenzaldehyde, 2,4-dichloro-benzaldehyde, 2-chlorobenzaldehyde-5-sulfonic acid, benzaldehyde-2-sulfonic acid, benzaldehyde-3-sulfonic acid, benzaldehyde-4-sulfonic acid, benzaldehyde-2,4-disulfonic acid, 1-naphthaldehyde, 2-naphthaldehyde, furan-2-aldehyde, thiophene-2-aldehyde, pyrrole-2-aldehyde, imidazole-2-aldehyde, pyrazole-5-aldehyde, pyridine-2-aldehyde, pyridine-3-aldehyde, pyridine-4-aldehyde, pyrimidine-5-aldehyde, quinoline-4-aldehyde, benzimidazole-2-aldehyde, acetaldehyde, propionaldehyde, n-butyraldehyde, oenanthaldehyde, acrylaldehyde, crotonaldehyde, phenacetaldehyde or cinnamaldehyde.

Aromatic amines which are used as starting compounds for the corresponding aromatic hydrazines are, for example, aminophenol, 4- or 5-methyl-2-aminophenol, 4- or 5-sulfo-2-aminophenol, 4-sulfo-6-carboxy-2-aminophenol, 4-methoxy-2-aminophenol, 5-methylsulfonyl-2-aminophenol, 4-dimethylaminosulfamoyl-2-aminophenol, 5-nitro-2-aminophenol, 4-bromo-2-aminophenol, 1-amino-2-hydroxy-naphthalene-4,6-disulfonic acid, 1-amino-2-hydroxy-6-nitro-naphthalene-4-sulfonic acid, 1-amino-2-hydroxy-6-chloro-naphthalene-4-sulfonic acid, 2-aminobenzoic acid, 4- or 5-sulfo-2-amino-benzoic acid, 5-nitro-2-aminobenzoic acid, 5-chloro-2-aminobenzoic acid and 5-methoxy-2-aminobenzoic acid.

The aromatic amine of the formula (3) used as the starting compound can be prepared in a manner which is in itself known, for example by reacting 4-(β-hydroxyethylsulfonyl)-2-amino-phenol with concentrated sulfuric acid, which preferably contains sulfur trioxide, and converting the esterified and sulfated compound prepared into the corresponding 4-(β-thiosulfatoethyl)- or 4-vinyl-sulfonyl-2-aminophenol-6-sulfonic acid, by a procedure analogous to that mentioned above.

The metal complex formazan compounds according to the invention have valuable dyestuff properties; as a result of their vinylsulfonyl group or β-thiosulfatoethylsulfonyl group, they also have fiber-reactive properties. They are preferably used for dyeing (in the general sense) materials containing hydroxy groups, amino groups or carbonamide groups, for example in the form of sheet-like structures, such as films, paper and leather, or in bulk, such as polyamide and polyurethane, and in particular materials of this type in fiber form.

The present invention thus also relates to the use of the compounds of the general formula (1) for dyeing (including bulk dyeing and printing) these materials and to processes for dyeing such materials by a procedure which is in itself customary, in which a compound of the general formula (1) is employed as the colorant. The materials are preferably used in the form of fiber materials, in particular in the form of textile fibers.

Materials containing hydroxyl groups are natural or synthetic materials containing hydroxy groups, such as, for example, cellulose fiber materials or regenerated products thereof and polyvinyl alcohols. Cellulose fiber materials are, preferably, cotton, but also other vegetable fibers, such as linen, hemp, jute and ramie fibers; regenerated cellulose fibers are, for example, viscose staple and filament viscose.

Materials containing carbonamide groups are, for example, synthetic and natural polyamides and polyurethanes, in particular in the form of fibers, for example wool and other animal hair, silk, leather, polyamide 6,6, polyamide 6, polyamide 11 and polyamide 4.

The compounds of the formula (1) according to the invention can be applied to and fixed on the substrates mentioned, in particular on the fiber materials mentioned, by the application techniques known for water-soluble dyestuffs, in particular for fiber-reactive dyestuffs.

Thus, very good color yields are obtained with them on cellulose fibers by the exhaustion process, from a long liquor, using the most diverse acid-binding agents and, if appropriate, neutral salts, such as, for example, sodium chloride or sodium sulfate. Dyeing is carried out in an aqueous bath at temperatures between 60° and 100° C., and if appropriate at temperatures of up to 120° C., under pressure, if appropriate in the presence of customary dyeing auxiliaries. A procedure can be followed in which the material is introduced into the warm bath, the bath is warmed gradually to the desired dyeing temperature and the dyeing process is brought to completion at this temperature. The neutral salts, which accelerate absorption of the dyestuff, can, if desired, also be added to the bath only after the actual dyeing temperature has been reached.

Excellent color yields are also obtained on cellulose fibers by the padding process, it being possible for the dyestuffs to be fixed in the customary manner by batching at room temperature or elevated temperature, for example up to about 60° C., by steaming or with dry heat.

Deep prints with very sharp contours and a clear white ground are likewise obtained by the printing processes which are customary for cellulose fibers and which can be carried out in one stage, for example in the presence of sodium bicarbonate or other acid-binding agents in the printing paste and by subsequent steaming at 101° to 103° C., or in two stages, for example by printing with a neutral or weakly acid printing paste and then either by passing through a hot alkaline bath containing electrolytes or by over-padding with an alkaline padding liquor containing electrolytes and subsequently batching this treated material or subsequently steaming it or subsequently treating it with dry heat. The quality of the prints is only slightly dependent on the varying fixing conditions. The degrees of fixing obtained with the compounds according to the invention are very high both in the case of dyeing and in the case of printing.

In the case of fixing by means of dry heat by the customary thermofixing processes, hot air at 120° to 200° C. is used. As well as the customary steam of 101° to 103° C., it is also possible to use superheated steam and pressurized steam at temperatures of up to 160° C.

The acid-binding agents which effect fixing of the dyestuffs on the cellulose fibers are, for example, water-soluble basic salts of the alkali metals and also of alkaline earth metals and inorganic or organic acids, or compounds which liberate alkali under the influence of heat. The alkali metal hydroxides and alkali metal salts of weak to medium-strength inorganic or organic acids may be mentioned in particular, the sodium and potassium compounds preferably being meant by alkali metal compounds. Such acid-binding agents are, for example, sodium hydroxide, potassium hydroxide, sodium carbonate, sodium bicarbonate, potassium carbonate, sodium formate, sodium dihydrogen phosphate, disodium hydrogen phosphate, sodium trichloroacetate, waterglass and trisodium phosphate.

The compounds (dyestuffs) according to the invention are bonded chemically to the cellulose fibers by treating them on said fiber material with the acid-binding agent, optionally under the influence of heat; after the customary after-treatment by rinsing in order to remove non-fixed portions of dyestuff, the cellulose dyeings have excellent fastness to wet processing.

With respect to the coloristic properties of the compounds according to the invention, it should be particularly emphasized that they are distinguished by good stability in printing pastes and padding liquors, even in the presence of alkali, by a very good affinity from a long liquor, by good color build-up when applied by the customary dyeing and printing processes, by a uniform depth of color in the case of dyeing on cotton and regenerated cellulose fibers, by a level appearance of the dyeings and prints produced with them and also by a uniform quality of dyeing from a long liquor when various amounts of electrolytes are added.

Dyeings on polyurethane fibers and polyamide fibers are usually carried out from an acid medium. Thus, for example, acetic acid and/or ammonium sulfate and/or acetic acid and ammonium acetate or sodium acetate can be added to the dyebath in order to obtain the desired pH value. It is advisable to add customary levelling auxiliaries, such as, for example, a levelling auxiliary based on a reaction product of cyanuric chloride with three times the molar amount of an aminobenzenesulfonic acid and/or an aminonaphthalenesulfonic acid, and/or based on a reaction product of, for example, stearylamine and ethylene oxide, for the purpose of achieving a serviceable levelness of the dyeing. As a rule, the material to be dyed is introduced, at a temperature of about 40° C., into the bath, which has initially been rendered weakly alkaline, and is agitated in the bath for some time, the dyebath is then adjusted to a weakly acid pH, preferably by means of acetic acid, and the actual dyeing is carried out at a temperature between 60° and 98° C. Dyeings can, however, also be carried out at the boiling point or at temperatures up to 120° C. (under pressure).

The dyeings and prints produced with the compounds according to the invention are distinguished by very pure, predominantly blue color shades. The dyeings and prints on cellulose fiber materals, in particular, have a good depth of color and good to very good fastness properties in use and manufacturing processes, such as a very good fastness to light and rubbing and outstanding fastness to wet processing, such as fastness to washing, chlorinated water, chlorine bleaching, seawater, fulling, alkali, acid and perspiration, and also a good fastness to ironing and a good fastness to drycleaning. Non-fixed portions of dyestuff can easily be completely washed out of the fiber material again, which is an essential prerequisite for the good fastness to wet processing of the dyeings obtainable. Moreover, the dyeings are stable towards the customary synthetic resin finishes. The compounds (dyestuffs) according to the invention achieve, in some cases, the customary anthraquinone standard with regard to the purity of the color shade, and moreover they have the advantage of being very much more readily discharged compared with the anthraquinone dyestuffs mentioned.

Compounds of the formula (1) which contain a total of two sulfonic acid groups, but preferably one lower alkylsulfonyl group or one sulfamoyl group which is optionally substituted by lower alkyl, have a very good affinity for wool and polyamide material with similar dyeing properties, and in many cases they are absorbed completely onto this material even from a neutral to weakly acid bath. If necessary, the water-solubility of these dyestuffs can be increased further with the aid of anionic or non-ionic wetting agents or dispersing agents or extenders.

The examples below serve to illustrate the invention. Unless otherwise indicated, the parts mentioned in these examples are parts by weight and the percentage data represent percentages by weight. Parts by weight relate to parts by volume as kilograms to liters.

EXAMPLE 1

40.0 parts of the hydrazone obtained from 2-carboxyphenylhydrazine-4-sulfonic acid and benzaldehyde-3-sulfonic acid are suspended in 200 parts of water at 20° to 25° C. and are dissolved at a pH value of 6.5 to 7 by adding aqueous sodium hydroxide solution. An aqueous diazonium salt solution which has been obtained from 4-($\beta$-thiosulfatoethylsulfonyl)-6-sulfo-2-aminophenol by customary diazotization of 39.3 parts of this aminophenol in aqueous solution are added, at a temperature of 5° to 15° C., to the solution obtained and 100 parts by volume of aqueous 1 molar copper sulfate solution are then added dropwise in the course of 15 minutes, the pH value in each case being kept between 5.5 and 6.5 with a total of 19 parts of sodium carbonate. The mixture is subsequently stirred for a further 1 to 2 hours at room temperature until the coupling reaction has ended and the reaction mixture is then adjusted to a pH value of 1 with 30 parts by volume of concentrated hydrochloric acid. This strongly acid solution is further stirred for one hour, potassium carbonate is added until the pH value is 5.5 and the copper-complex formazan compound formed is then precipitated by means of potassium chloride, filtered off, washed with dilute aqueous potassium chloride solution and dried at 80° C. A dark powder which dissolves in water giving a dark blue-colored solution is obtained. As a powder containing electrolytes, it contains the alkali metal salt, predominantly the potassium salt, of the compound of the formula:

presence of an acid-binding agent. The dyeings, which are after-treated in the customary manner by soaping for 10 minutes and rinsing with water, are found to be very fast to light and wet processing.

EXAMPLE 2

40.0 parts of the hydrazone obtained from 2-carboxyphenylhydrazine-4-sulfonic acid and benzaldehyde-4-sulfonic acid are dissolved as in Example 1. An aqueous diazonium salt solution which has been obtained in the customary manner by diazotization of 37.7 parts of 4-($\beta$-sulfatoethylsulfonyl)-6-sulfo-2-aminophenol is added to the solution obtained; the temperature at which this operation is carried out should not exceed 20° C. and the pH value is kept at 5.5 to 6.5. 100 parts by volume of an aqueous 1 molar copper sulfate solution are then added dropwise at 10° to 15° C. in the course of 15 minutes, and in this case also the pH value is kept at 5.5 to 6.5, by means of sodium carbonate. The mixture is subsequently stirred at room temperature for 1 to 2 hours until the coupling reaction has ended and the pH is then adjusted to about 1 with 30 parts by volume of concentrated hydrochloric acid. This strongly acid reaction mixture is subsequently stirred for a further hour and the pH value is then adjusted to 6.8 to 7.2 with sodium carbonate (about 18 parts).

The $\beta$-sulfatoethylsulfonyl-copper-complex formazan compound contained in the solution is to be converted into the corresponding vinylsulfonyl compound. For this, the solution is warmed to 50° to 55° C. and 21 parts of sodium carbonate in 76 parts of water are added in the course of 5 to 10 minutes; during this addition, the pH value rises to about 9.2. In order to bring the reaction to completion, the mixture is stirred for 30 to 40 minutes and the pH value is then adjusted to 6.5 with about 20 parts by volume of approximately 17% strength hydrochloric acid at a temperature of 50° to 55° C.

The vinylsulfone-copper-complex formazan compound of the formula (written in the form of the free acid):

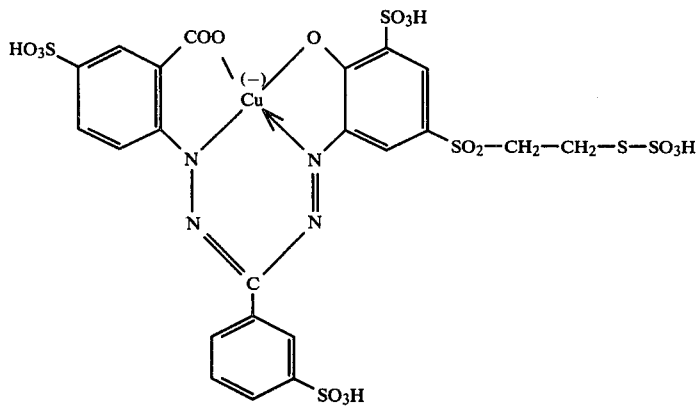

This compound is particularly suitable for use as a dyestuff and dyes cotton and regenerated cellulose fibers in pure blue color shades from a long liquor in the

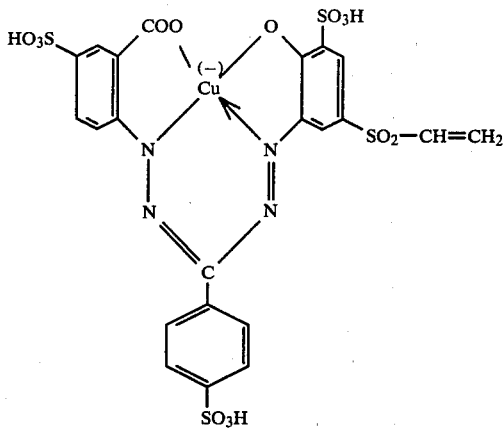

thus prepared is isolated in the customary manner by spray-drying. The dark powder obtained contains the sodium salt of this copper-complex formazan compound, this salt having very good dyestuff properties and giving strong, clear, blue dyeings and prints, with a good depth of color and good fastness properties, on cellulose fiber materials or polyamide fiber materials by the customary methods of application and fixing.

EXAMPLE 3

The vinylsulfonyl-copper formazan compound of Example 2 can be used as the starting material for the preparation of the compound of the formula

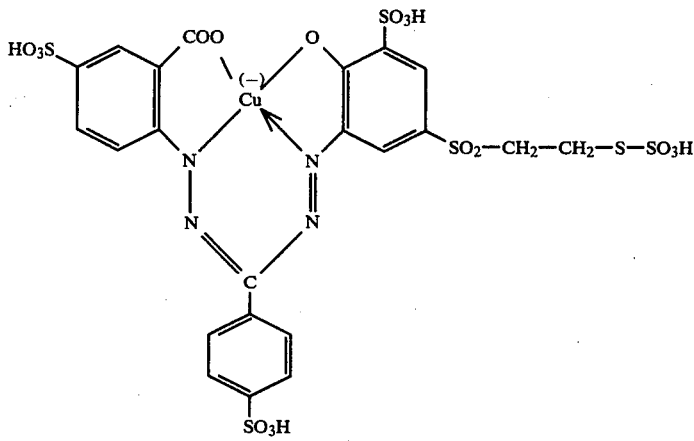

according to the invention, but does not need to be first isolated. The synthesis solution obtained in Example 2 is adjusted to a pH value of 6.8 to 7.2 (instead of about 6.5) and then warmed to 70° to 75° C.; 37.5 parts of sodium thiosulfate (crystalline) are added and the solution is stirred at a pH value of 5.7 to 6.2 for four hours, this pH value being maintained by adding 40 parts by volume of aqueous 50% strength acetic acid in portions. Kieselguhr is then added, the solution is clarified and potassium chloride is added to the filtrate in an amount of 15%, relative to the volume of the filtrate. The mixture is allowed to cool, whilst stirring, and the compound which has separated out is filtered off and dried at 80° C.

A dark powder which dissolves in water giving a dark blue-colored solution is obtained. It contains the alkali metal salt, predominantly the potassium salt, of the compound of the above formula. This copper-complex formazan compound is likewise particularly suitable as a water-soluble dyestuff for dyeing cellulose fiber materials and polyamide fiber materials. Strong, clear, blue dyeings and prints with a good depth of color and good fastness properties are obtained by the customary methods of application and fixing.

EXAMPLE 4

35.5 parts of the hydrazone obtained from 2-carboxyphenyl-hydrazine-5-sulfonic acid and 4-chlorobenzaldehyde are suspended in 250 parts of water at 20° to 25° C. and dissolved at a pH value of 6.5 to 7 with concentrated aqueous sodium hydroxide solution. An aqueous diazonium salt solution obtained by customary diazotization of 27.9 parts of 4-vinylsulfonyl-6-sulfo-2-aminophenol is added to this solution at a pH value of about 6 and at a temperature of 5° to 15° C., and an aqueous solution of 25 parts of crystalline copper sulfate in 125 parts of water is then added dropwise at a temperature of 10° to 15° C. in the course of 15 minutes, the pH value in both cases being kept at 5.5 to 6.5 by means of a total of 19 parts of sodium carbonate.

The mixture is subsequently stirred for a further 1 to 2 hours at room temperature until the coupling reaction has ended and the reaction solution is then adjusted to a pH value of about 1 with 30 parts by volume of concentrated hydrochloric acid. The mixture is subsequently stirred for one hour and the pH value is then adjusted to 6.5 with sodium carbonate. The copper-complex formazan compound of the formula (written in the form of the free acid):

sponding alkali metal salt of the compound of the formula:

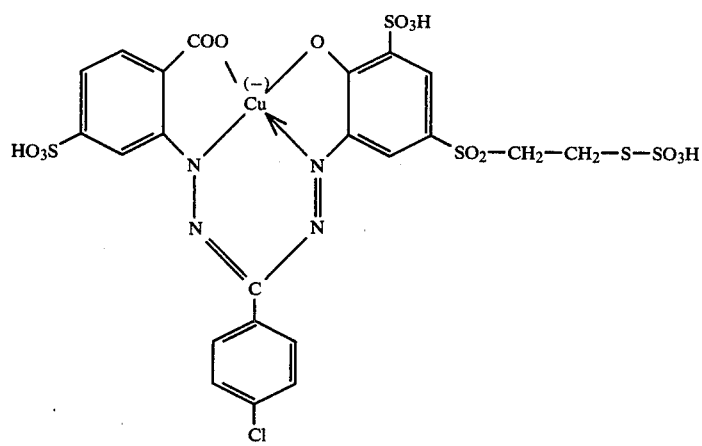

30

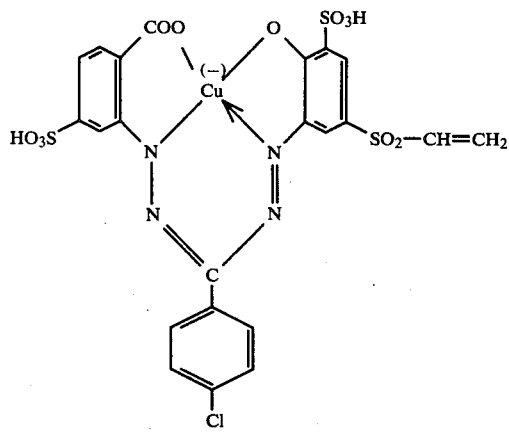

thus prepared can be isolated by spray-drying or by salting out as the sodium or potassium salt by means of sodium chloride or potassium chloride. It has very good dyestuff properties and dyes, for example, cellulose fiber materials in deep, clear, blue color shades, with very good fastness to light and wet processing, by customary application and fixing methods for fiber-reactive dyestuffs.

EXAMPLE 5

The vinylsulfone compound of Example 4 is prepared, without being isolated. The acid synthesis solution is adjusted to a pH value of 6.8 to 7.2 with about 18 parts of sodium carbonate and is then converted into the thiosulfatoethylsulfone-copper-complex formazan compound according to the invention by means of sodium thiosulfate in accordance with the statements of Example 3, and the product is isolated by salting out by means of sodium chloride or potassium chloride. The correis obtained in the form of a dark powder containing electrolytes. It dyes cellulose fiber materials in deep, clear, blue color shades, with very good fastness to light and wet processing, in accordance with the customary application and fixing method for fiber-reactive dyestuffs.

EXAMPLE 6

32.0 parts of the hydrazone obtained from 2-carboxyphenylhydrazine-4-sulfonic acid and benzaldehyde are suspended in 250 parts of water at 20° to 25° C. and are dissolved at a pH value of 6.5 to 7 with aqueous sodium hydroxide solution. 150 parts by volume of a copper sulfate solution which contains 25 parts of copper sulfate are added, during which the pH value is kept at 6 to 7. An aqueous solution of the diazonium salt obtained by customary diazotization of 39.3 parts of 4-(β-thiosulfatoethylsulfonyl)-6-sulfo-2-aminophenol is added to the solution obtained; during the addition of the diazonium salt solution, a pH value of 5.5 to 6.5 is maintained with sodium carbonate. The reaction mixture is subsequently stirred for one hour in order to bring the coupling reaction and metallization reaction to completion, and about 30 parts by volume of concentrated hydrochloric acid are then added in order to adjust the pH value to 1. This strongly acid solution is subsequently stirred for one hour and then adjusted to a pH value of 5.5 with potassium carbonate. The copper-complex formazan compound formed is precipitated by means of potassium chloride and filtered off, washed with dilute aqueous potassium chloride solution and dried thoroughly to 80° C.

The copper-complex compound thus obtained has the formula, written in the form of the free acid,

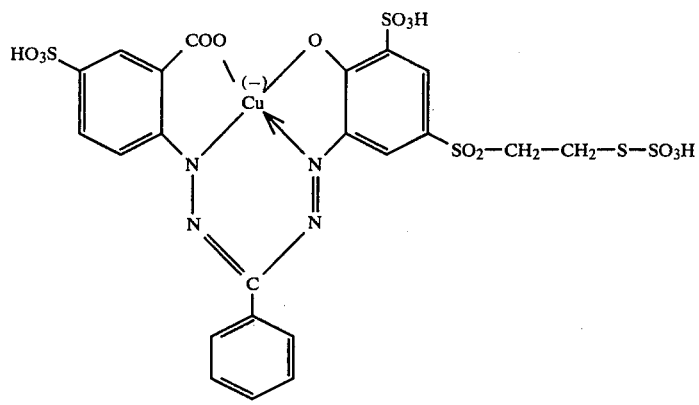

It has very good dyestuff properties and dissolves in water giving a blue-colored solution, and the quality of its dyeing properties and the fastness properties of the dyeings and prints thus produced have good advantages similar to those of the formazan dyestuff, according to the invention, described in Example 1.

EXAMPLE 7

35.5 parts of the hydrazone obtained from 2-carboxyphenylhydrazine-4-sulfonic acid and 2-chlorobenzaldehyde are suspended in 200 parts of water at 20 to 25° C. and are dissolved at a pH value of 6.5 to 7 with aqueous sodium hydroxide solution. An aqueous diazonium salt solution of the diazonium salt obtained by customary diazotization of 39.3 parts of 4-(β-thiosulfatoethylsulfonyl)-6-sulfo-2-aminophenol, and 100 parts by volume of aqueous 1 molar copper sulfate solution (the diazonium salt solution and the copper sulfate solution can also be combined beforehand) are allowed to run simultaneously into the resulting solution in the course of 15 to 25 minutes, during which the temperature is kept between about 5° and 20° C., preferably at 10° to 15° C., and the pH value is kept at 5.5 to 6.5 with about 19 parts of sodium carbonate. This reaction mixture is stirred for about a further hour at 15° to 25° C. and is then adjusted to a pH value of 1 with about 30 parts by volume of concentrated hydrochloric acid. The acid solution is stirred for one hour at about 20° C. and then adjusted to a pH value of 5.5 with potassium carbonate; the copper-complex formazan compound formed is precipitated with potassium chloride, filtered off, washed with dilute aqueous potassium chloride solution and dried thoroughly at 80° C.

A dark powder which contains the alkali metal salt, predominantly the potassium salt, of the compound of the formula:

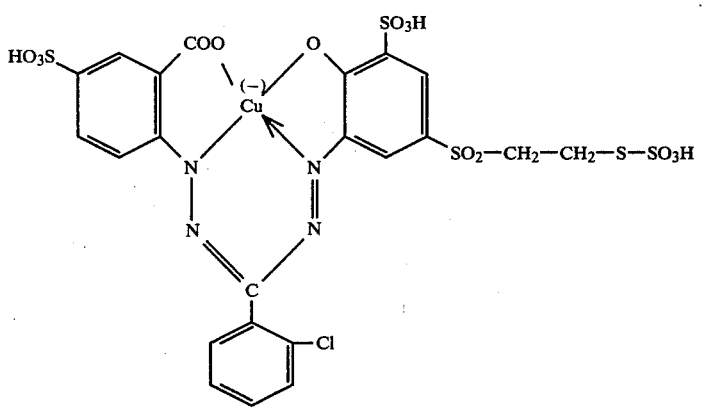

together with electrolyte (potassium chloride), is obtained. This copper-complex compound has very good dyestuff properties and dyes cellulose fiber materials in reddish-tinged blue shades, with good fastness properties, in particular good fastness to light, by application and fixing processes customary for fiber-reactive dyestuffs.

EXAMPLES 8 TO 38

If the compounds of the formula (1) in which Y is the β-thiosulfatoethyl group are prepared according to the invention, for example analogously to the above embodiment Examples 1, 3, 5, 6, or 7, and the starting compounds mentioned in the following tabular examples and an appropriate salt which donates copper are employed, the corresponding β-thiosulfatoethylsulfonyl-copper-complex formazan compounds according to the invention are obtained, likewise in good yield. They have good dyeing properties and, on polyamide fiber materials and polyurethane fiber materials, and in particular on cellulose fiber materials, give dyeings and prints with good fastness properties and the color shades given in the table.

| Example | Hydrazine component (A) | Aldehyde component (B) | Amine of the formula (3) | Complex-forming metal | Color shade on cellulose |
|---|---|---|---|---|---|
| 8 | 2-carboxy-4-sulfo-phenylhydrazine | 2-sulfo-benzaldehyde | 4-(β-thiosulfato-ethylsulfonyl)-6-sulfo-2-amino-phenol | Cu | blue |
| 9 | 2-hydroxy-5-(N,N—dimethyl-sulfamoyl)-phenylhydrazine | 3-sulfo-benzaldehyde | 4-(β-thiosulfato-ethylsulfonyl)-6-sulfo-2-amino-phenol | Cu | greenish-tinged blue |
| 10 | 2-carboxy-4-sulfo-phenylhydrazine | 4-methoxy-benzaldehyde | 4-(β-thiosulfato-ethylsulfonyl)-6-sulfo-2-amino-phenol | Cu | greenish-tinged blue |
| 11 | 2-carboxy-4-sulfo-phenylhydrazine | 4-carboxy-benzaldehyde | 4-(β-thiosulfato-ethylsulfonyl)-6-sulfo-2-amino-phenol | Cu | greenish-tinged blue |
| 12 | 2-hydroxy-4-sulfo-6-nitro-naphthyl-1-hydrazine | 3-sulfo-benzaldehyde | 4-(β-thiosulfato-ethylsulfonyl)-6-sulfo-2-amino-phenol | Cu | green |
| 13 | 2-carboxy-4-sulfo-phenylhydrazine | 4-sulfo-benzaldehyde | 4-(β-thiosulfato-ethylsulfonyl)-6-sulfo-2-amino-phenol | Cu | blue |
| 14 | 2-carboxy-4-sulfo-phenylhydrazine | 2-hydroxy-benzaldehyde | 4-(β-thiosulfato-ethylsulfonyl)-6-sulfo-2-amino-phenol | Cu | greenish-tinged blue |
| 15 | 2-carboxy-4-sulfo-phenylhydrazine | 1-naphthaldehyde | 4-(β-thiosulfato-ethylsulfonyl)-6-sulfo-2-amino-phenol | Cu | greenish-tinged blue |
| 16 | 2-carboxy-4-sulfo-phenylhydrazine | furyl-2-aldehyde | 4-(β-thiosulfato-ethylsulfonyl)-6-sulfo-2-amino-phenol | Cu | bluish-tinged green |
| 17 | 2-carboxy-4-sulfo-phenylhydrazine | 3-sulfo-benzaldehyde | 4-(β-thiosulfato-ethylsulfonyl)-6-sulfo-2-amino-phenol | Cu | greenish-tinged blue |
| 18 | 2-carboxy-4-sulfo-phenylhydrazine | 2-chloro-benzaldehyde | 4-(β-thiosulfato-ethylsulfonyl)-6-sulfo-2-amino-phenol | Cu | reddish-tinged blue |
| 19 | 2-carboxy-5-sulfo-phenylhydrazine | 4-chloro-benzaldehyde | 4-(β-thiosulfato-ethylsulfonyl)-6-sulfo-2-amino-phenol | Cu | blue |
| 20 | 2-carboxy-5-sulfo-phenylhydrazine | 3-sulfo-benzaldehyde | 4-(β-thiosulfato-ethylsulfonyl)-6-sulfo-2-amino-phenol | Cu | greenish-tinged blue |
| 21 | 2-carboxy-5-sulfo-phenylhydrazine | 2,4-dichloro-benzaldehyde | 4-(β-thiosulfato-ethylsulfonyl)-6-sulfo-2-amino-phenol | Cu | reddish-tinged blue |
| 22 | 2-carboxy-5-sulfo-phenylhydrazine | 2-methoxy-benzaldehyde | 4-(β-thiosulfato-ethylsulfonyl)-6-sulfo-2-amino-phenol | Cu | reddish-tinged blue |
| 23 | 2-carboxy-5-sulfo-phenylhydrazine | cinnamaldehyde | 4-(β-thiosulfato-ethylsulfonyl)-6-sulfo-2-amino-phenol | Cu | yellowish-tinged green |
| 24 | 2-carboxy-5-sulfo-phenylhydrazine | 3-nitrobenzaldehyde | 4-(β-thiosulfato-ethylsulfonyl)-6-sulfo-2-amino-phenol | Cu | greenish-tinged blue |
| 25 | 2-carboxy-phenylhydrazine | 2,4-disulfo-benzaldehyde | 4-(β-thiosulfato-ethylsulfonyl)-6-sulfo-2-amino-phenol | Cu | reddish-tinged blue |
| 26 | 2-carboxy-phenylhydrazine | 4-sulfobenzaldehyde | 4-(β-thiosulfato-ethylsulfonyl)-6-sulfo-2-amino-phenol | Cu | blue |
| 27 | 2-carboxy-phenylhydrazine | 4-chloro-2-sulfo-benzaldehyde | 4-(β-thiosulfato-ethylsulfonyl)-6- | Cu | blue |

-continued

| | Compound of the general formula (1) obtained from the starting compounds: | | | | |
|---|---|---|---|---|---|
| Example | Hydrazine component (A) | Aldehyde component (B) | Amine of the formula (3) | Complex-forming metal | Color shade on cellulose |
| 28 | 2-carboxy-phenylhydrazine | 2-sulfo-benzaldehyde | sulfo-2-amino-phenol 4-(β-thiosulfato-ethylsulfonyl)-6-sulfo-2-amino-phenol | Cu | reddish-tinged blue |
| 29 | 2-carboxy-4-nitro-phenylhydrazine | 4-sulfobenzaldehyde | 4-(β-thiosulfato-ethylsulfonyl)-6-sulfo-2-amino-phenol | Cu | bluish-tinged green |
| 30 | 2-carboxy-4-chloro-phenylhydrazine | 2-sulfo-benzaldehyde | 4-(β-thiosulfato-ethylsulfonyl)-6-sulfo-2-amino-phenol | Cu | reddish-tinged blue |
| 31 | 2-hydroxy-4-methyl-sulfonyl-phenylhydrazine | 2-sulfo-benzaldehyde | 4-(β-thiosulfato-ethylsulfonyl)-6-sulfo-2-amino-phenol | Cu | blue |
| 32 | 2-carboxy-4-methoxy-phenylhydrazine | 2-sulfo-benzaldehyde | 4-(β-thiosulfato-ethylsulfonyl)-6-sulfo-2-amino-phenol | Cu | reddish-tinged blue |
| 33 | 2-hydroxy-5-sulfo-phenylhydrazine | benzaldehyde | 4-(β-thiosulfato-ethylsulfonyl)-6-sulfo-2-amino-phenol | Cu | greenish-tinged blue |
| 34 | 2-hydroxy-5-sulfo-phenylhydrazine | 3-sulfo-benzaldehyde | 4-(β-thiosulfato-ethylsulfonyl)-6-sulfo-2-amino-phenol | Cu | greenish-tinged blue |
| 35 | 2-hydroxy-5-sulfo-phenylhydrazine | 2-chloro-benzaldehyde | 4-(β-thiosulfato-ethylsulfonyl)-6-sulfo-2-amino-phenol | Cu | reddish-tinged blue |
| 36 | 2-hydroxy-3-carboxy-5-sulfo-phenylhydrazine | 4-carbomethoxy-benzaldehyde | 4-(β-thiosulfato-ethylsulfonyl)-6-sulfo-2-amino-phenol | Cu | greenish-tinged blue |
| 37 | 2-hydroxy-3-carboxy-5-sulfo-phenylhydrazine | benzaldehyde | 4-(β-thiosulfato-ethylsulfonyl)-6-sulfo-2-amino-phenol | Cu | greenish-tinged blue |
| 38 | 2-hydroxy-4,6-disulfo-naphthyl-1-hydrazine | 2-chloro-benzaldehyde | 4-(β-thiosulfato-ethylsulfonyl)-6-sulfo-2-amino-phenol | Cu | blue-green |

EXAMPLE 39

21.7 parts of 4-(β-hydroxyethylsulfonyl)-2-aminophenol are introduced into 46.0 parts of 100% pure sulfuric acid; 32.0 parts of 65% strength oleum are then slowly added at 120° C. in the course of 2 to 3 hours and the reaction mixture is stirred at 120° C. for 1 to 2 hours for the formation of 4-(β-sulfatoethylsulfonyl)-2-aminophenol-6-sulfonic acid. The reaction mixture is then cooled, poured onto 350 parts of ice and buffered until acid to Congo Red with 50 parts of calcium carbonate, and the amine is then diazotized in the customary manner by means of aqueous sodium nitrite solution. A further 35 parts of calcium carbonate are then added to give a pH value of 4–5, and a neutral solution, in 300 parts of water, of 32.0 parts of the hydrazone obtained from 2-carboxy-phenylhydrazine-4-sulfonic acid and benzaldehyde is added rapidly. During this addition, the pH value rises to about 6.5. 100 parts by volume of aqueous 1 molar copper sulfate solution are then added dropwise at a temperature of 10°–15° C. in the course of 15 minutes; the mixture is subsequently stirred for a further hour at a pH value of 5.5–6.5 and the pH value is then adjusted to about 1 with 20% strength aqueous sulfuric acid. After stirring the mixture for one hour, the pH is readjusted to a value of 6 with about 15 parts of calcium carbonate, the calcium sulfate formed is filtered off and the filtrate is adjusted to a pH value of 12.5 with 12 parts by volume of concentrated aqueous sodium hydroxide solution at a temperature of 15°–25° C., whilst stirring. The vinylsulfonyl compound according to the invention is rapidly formed, and the reaction has ended quantitatively after 30–40 minutes. The pH value is adjusted to 5 with 25 parts by volume of 20% strength aqueous sulfuric acid, sodium oxalate is added, the mixture is stirred for several hours and clarified with kieselguhr and the vinylsulfonyl compound formed is isolated, for example by evaporating the solution at a pH value of 5.5 (for example at 60° C. under reduced pressure) or by spray-drying.

A dark powder which dissolves in water giving a dark blue-colored solution is obtained. As a powder containing electrolytes, it contains the alkali metal salt, predominantly the sodium salt, of the compound of the formula:

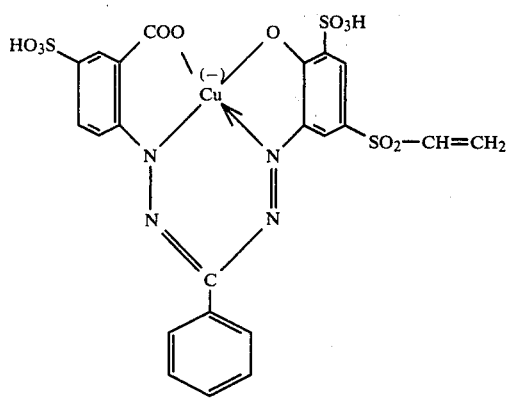

This compound is particularly suitable for use as a dyestuff and dyes cotton and regenerated cellulose fibers in pure blue color shades from a long liquor in the presence of an acid-binding agent. The dyeings, after-treated in the customary manner by soaping for 10 minutes and rinsing with water, are found to be very fast to light and wet processing. Of the fastnesses to wet processing, fastness to washing and fastness to alkaline and acid perspiration are to be particularly emphasized.

EXAMPLE 40

32.0 parts of the hydrazone obtained from 2-carboxy-phenylhydrazine-4-sulfonic acid and benzaldehyde are suspended in 250 parts of water at 20°–25° C. and are dissolved at a pH value of 6.5–7 with concentrated aqueous sodium hydroxide solution. An aqueous diazonium salt solution which has been obtained by customary diazotization of 27.9 parts of 4-vinylsulfonyl-6-sulfo-2-aminophenol is added to the resulting solution at a pH value of about 6 and a temperature of 5°–15° C., and an aqueous solution of 25 parts of crystalline copper sulfate in 150 parts of water is then added dropwise at a temperature of 10° to 15° C. in the course of 15 minutes, the pH value in both cases being kept at 5.5–6.5 by means of a total of 19 parts of sodium carbonate. The mixture is subsequently stirred for a further 1–2 hours at room temperature until the coupling reaction has ended and the reaction solution is then adjusted to a pH value of about 1 with 30 parts by volume of concentrated aqueous hydrochloric acid. The mixture is subsequently stirred for 1 hour and then adjusted to a pH value of 5.5 with about 15 parts of sodium carbonate. The copper-complex formazan compound formed is precipitated by means of sodium chloride and filtered off, washed with dilute aqueous sodium chloride solution and dried thoroughly at 80° C. A dark electrolyte-containing powder which contains the vinylsulfonyl-copper-complex formazan compound, according to the invention, described in Example 39 is obtained. This compound has the same good dyeing properties and likewise produces equally good fast, deep dyeings.

EXAMPLE 41

An aqueous solution of 32 parts of the hydrazone obtained from 2-carboxy-phenylhydrazine-5-sulfonic acid and benzaldehyde is prepared according to the statements of Example 40. An aqueous diazonium salt solution obtained from 37.7 parts of 4-(β-sulfatoethylsulfonyl)-6-sulfo-2-aminophenol, diazotized in the customary manner, is added to the solution obtained, during which the temperature should not exceed 15° C. and the pH value is kept at 5.5–6.5. 100 parts by volume of aqueous 1 molar copper sulfate solution are then added dropwise in the course of 15 minutes, during which the pH value is kept between 5.5 and 6.5 by means of sodium carbonate. The mixture is further stirred for one hour and the pH is then adjusted to a value of about 1 by means of 30 parts by volume of concentrated hydrochloric acid. This strongly acid reaction mixture is subsequently stirred for one hour and then neutralized to a pH value of 6.8–7.2 with about 18 parts of sodium carbonate. In order to convert the β-sulfatoethylsulfonyl-copper-complex formazan compound contained in the solution into the vinylsulfonyl compound according to the invention, the solution is warmed to 50° to 55° C.; 21 parts of sodium carbonate in 76 parts of water are added at this temperature in the course of 5–10 minutes, whilst stirring. During this addition, the pH value rises to about 9.2. In order to bring the reaction to completion, the mixture is subsequently stirred for a further 30–40 minutes and approximately 16% strength hydrochloric acid is then added until the pH value is 5.5. The copper-complex formazan compound formed is precipitated by means of potassium chloride, filtered off, washed with dilute aqueous potassium chloride solution and dried thoroughly at 80° C.

An electrolyte-containing powder which contains the alkali metal salt, predominantly the potassium salt, of the compound of the formula:

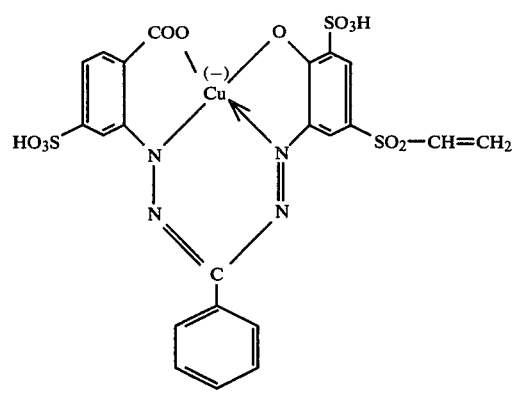

is obtained. This compound has very good fiber-reactive dyestuff properties and dyes, in particular, cellulose fiber materials in deep pure blue color shades with very good fastness to light and wet processing, by the application and fixing methods customary in the art.

EXAMPLES 42 TO 72

If compounds of the formula (1) in which Y is the vinyl group are prepared according to a process of the invention, for example analogously to the above embodiment Examples 2, 4, 39, 40, or 41, and the starting compounds mentioned in the tabular examples which follow and an appropriate salt which donates copper are employed for this, the corresponding vinylsulfonyl-copper-complex formazan compounds according to the invention are obtained, likewise in good yield. They have good dyeing properties and give, on polyamide fiber materials and polyurethane fiber materials, and in particular on cellulose fiber materials, dyeings and prints with good fastness properties and the color shades given in the table.

| Example | Hydrazine component (A) | Aldehyde component (B) | Amine of the formula (3) | Complex-forming metal | Color shade on cellulose |
|---|---|---|---|---|---|
| 42 | 2-carboxy-4-sulfo-phenylhydrazine | 2-sulfo-benzaldehyde | 4-vinylsulfonyl-6-sulfo-2-aminophenol | Cu | blue |
| 43 | 2-hydroxy-5-(N,N—dimethyl-sulfamoyl)-phenylhydrazine | 3-sulfo-benzaldehyde | 4-vinylsulfonyl-6-sulfo-2-aminophenol | Cu | greenish-tinged blue |
| 44 | 2-carboxy-4-sulfo-phenylhydrazine | 4-methoxy-benzaldehyde | 4-vinylsulfonyl-6-sulfo-2-aminophenol | Cu | greenish-tinged blue |
| 45 | 2-carboxy-4-sulfo-phenylhydrazine | 4-carboxy-benzaldehyde | 4-vinylsulfonyl-6-sulfo-2-aminophenol | Cu | greenish-tinged blue |
| 46 | 2-hydroxy-4-sulfo-6-nitro-naphthyl-1-hydrazine | 3-sulfo-benzaldehyde | 4-vinylsulfonyl-6-sulfo-2-aminophenol | Cu | green |
| 47 | 2-carboxy-4-sulfo-phenylhydrazine | 4-sulfo-benzaldehyde | 4-vinylsulfonyl-6-sulfo-2-aminophenol | Cu | blue |
| 48 | 2-carboxy-4-sulfo-phenylhydrazine | 2-hydroxy-benzaldehyde | 4-vinylsulfonyl-6-sulfo-2-aminophenol | Cu | greenish-tinged blue |
| 49 | 2-carboxy-4-sulfo-phenylhydrazine | 1-naphthaldehyde | 4-vinylsulfonyl-6-sulfo-2-aminophenol | Cu | greenish-tinged blue |
| 50 | 2-carboxy-4-sulfo-phenylhydrazine | furyl-2-aldehyde | 4-vinylsulfonyl-6-sulfo-2-aminophenol | Cu | bluish-tinged green |
| 51 | 2-carboxy-4-sulfo-phenylhydrazine | 3-sulfo-benzaldehyde | 4-vinylsulfonyl-6-sulfo-2-aminophenol | Cu | greenish-tinged blue |
| 52 | 2-carboxy-4-sulfo-phenylhydrazine | 2-chloro-benzaldehyde | 4-vinylsulfonyl-6-sulfo-2-aminophenol | Cu | reddish-tinged blue |
| 53 | 2-carboxy-5-sulfo-phenylhydrazine | 4-chloro-benzaldehyde | 4-vinylsulfonyl-6-sulfo-2-aminophenol | Cu | blue |
| 54 | 2-carboxy-5-sulfo-phenylhydrazine | 3-sulfo-benzaldehyde | 4-vinylsulfonyl-6-sulfo-2-aminophenyl | Cu | greenish-tinged blue |
| 55 | 2-carboxy-5-sulfo-phenylhydrazine | 2,4-dichloro-benzaldehyde | 4-vinylsulfonyl-6-sulfo-2-aminophenol | Cu | reddish-tinged blue |
| 56 | 2-carboxy-5-sulfo-phenylhydrazine | 2-methoxy-benzaldehyde | 4-vinylsulfonyl-6-sulfo-2-aminophenol | Cu | reddish-tinged blue |
| 57 | 2-carboxy-5-sulfo-phenylhydrazine | cinnamaldehyde | 4-vinylsulfonyl-6-sulfo-2-aminophenol | Cu | yellowish-tinged blue |
| 58 | 2-carboxy-5-sulfo-phenylhydrazine | 3-nitrobenzaldehyde | 4-vinylsulfonyl-6-sulfo-2-aminophenol | Cu | greenish-tinged blue |
| 59 | 2-carboxy-phenyl-hydrazine | 2,4-disulfo-benzaldehyde | 4-vinylsulfonyl-6-sulfo-2-aminophenol | Cu | reddish-tinged blue |
| 60 | 2-carboxy-phenyl-hydrazine | 4-sulfobenzaldehyde | 4-vinylsulfonyl-6-sulfo-2-aminophenol | Cu | blue |
| 61 | 2-carboxy-phenylhydrazine | 4-chloro-2-sulfo-benzaldehyde | 4-vinylsulfonyl-6-sulfo-2-aminophenol | Cu | blue |
| 62 | 2-carboxy-phenylhydrazine | 2-sulfo-benzaldehyde | 4-vinylsulfonyl-6-sulfo-2-aminophenol | Cu | reddish-tinged blue |
| 63 | 2-carboxy-4-nitro-phenylhydrazine | 4-sulfo-benzaldehyde | 4-vinylsulfonyl-6-sulfo-2-aminophenol | Cu | bluish-tinged green |
| 64 | 2-carboxy-4-chloro-phenylhydrazine | 2-sulfo-benzaldehyde | 4-vinylsulfonyl-6-sulfo-2-aminophenol | Cu | reddish-tinged blue |
| 65 | 2-hydroxy-4-methylsulfonyl-phenylhydrazine | 2-sulfo-benzaldehyde | 4-vinylsulfonyl-6-sulfo-2-aminophenol | Cu | blue |
| 66 | 2-carboxy-4-methoxy-phenylhydrazine | 2-sulfo-benzaldehyde | 4-vinylsulfonyl-6-sulfo-2-aminophenol | Cu | reddish-tinged blue |
| 67 | 2-hydroxy-5-sulfo-phenylhydrazine | benzaldehyde | 4-vinylsulfonyl-6-sulfo-2-aminophenol | Cu | greenish-tinged blue |

-continued

| Example | Hydrazine component (A) | Aldehyde component (B) | Amine of the formula (3) | Complex-forming metal | Color shade on cellulose |
| --- | --- | --- | --- | --- | --- |
| 68 | 2-hydroxy-5-sulfo-phenylhydrazine | 3-sulfo-benzaldehyde | 4-vinylsulfonyl-6-sulfo-2-aminophenol | Cu | greenish-tinged blue |
| 69 | 2-hydroxy-5-sulfo-phenylhydrazine | 2-chloro-benzaldehyde | 4-vinylsulfonyl-6-sulfo-2-aminophenol | Cu | reddish-tinged blue |
| 70 | 2-hydroxy-3-carboxy-5-sulfo-phenylhydrazine | 4-carbomethoxy-benzaldehyde | 4-vinylsulfonyl-6-sulfo-2-aminophenol | Cu | greenish-tinged blue |
| 71 | 2-hydroxy-3-carboxy-5-sulfo-phenylhydrazine | benzaldehyde | 4-vinylsulfonyl-6-sulfo-2-aminophenol | Cu | greenish-tinged blue |
| 72 | 2-hydroxy-4,6-disulfo-naphthyl-1-hydrazine | 2-chloro-benzaldehyde | 4-vinylsulfonyl-6-sulfo-2-aminophenol | Cu | blue-green |

USE EXAMPLE 1

For the purpose of dyeing 10 parts of a wool yarn, an aqueous bath which consists of 0.25 part by volume of 60% strength aqueous acetic acid, 0.15 part of a commercially available levelling auxiliary for wool and 0.3 part of ammonium sulfate in 400 parts of water is prepared. This wool is thoroughly wetted in the bath at a temperature of 30°–40° C. and a pH value of the bath of 5–5.2. A solution of 0.2 part of the vinyl-sulfonyl-copper-complex formazan dyestuff of Example 39 in 20 parts of water is then added to the bath, whilst stirring. The wool is further agitated in the bath and the temperature is left at 30°–40° C. for 5 minutes, the dyebath is then heated to 85° C. in the course of 40 minutes, dyeing is continued at this temperature for 10 minutes and the dyebath is then heated to the boiling point in the course of 10 minutes. Dyeing is continued at the boil for 1 hour. The bath is then cooled to 80° C. The dyestuff used has been absorbed very well onto the wool. The after-treatment of the dyed wool yarn can therefore be carried out in the same bath. Ammonia is added until the pH value is 8–8.5 and the material is treated at this pH and at a temperature of 80° C. for 15 minutes. It is taken out of the bath, rinsed with warm and cold water and dried. A deep blue dyeing with the very good fastness properties in use and manufacturing processes which are indicated in Example 39 is obtained.

USE EXAMPLE 2

An aqueous padding liquor which contains, per liter, 40 g of the vinylsulfonyl dyestuff of Example 39, 100 g of urea, 30 g of anhydrous sodium sulfate and 16 parts by volume of aqueous 32.5% strength sodium hydroxide solution is prepared for dyeing a cotton fabric. The cotton fabric is padded at room temperature with a liquor pick-up of 80% of the weight of the cotton fabric, wound onto a batching core, wrapped in a plastic film and left at room temperature for 24 hours. During this time, the dyestuff is fixed. After soaping and rinsing in the customary manner, a deep brilliant blue dyeing which has the good fastness properties in use and manufacturing processes which are mentioned in Example 39 is obtained on the cotton fabric.

USE EXAMPLE 3

An aqueous dyebath which contains, dissolved in 2,000 parts by volume, 5 parts of the vinylsulfonyl dyestuff of Example 41, 10 parts of anhydrous sodium sulfate, 10 parts of anhydrous sodium carbonate and 4 parts by volume of 32.5% strength aqueous sodium hydroxide solution is prepared for dyeing a cotton fabric. 100 parts of a cotton fabric are introduced into this dyebath and are dyed at a temperature of 60° C. for between 60 and 90 minutes. After soaping and rinsing in the customary manner, a deep, brilliant blue dyeing with the very good fastness properties in use and manufacturing processes which are given in the description is obtained.

USE EXAMPLE 4

A printing paste which contains, per 1,000 parts, 30 parts of the vinylsulfone dyestuff of Example 40, 50 parts of urea, 375 parts of water, 500 parts of a neutral 4% strength aqueous alginate thickener, 15 parts of sodium bicarbonate and 10 parts of the sodium salt of m-nitrobenzoic acid is used for printing a mercerized cotton fabric. The cotton fabric is printed with this printing paste in the customary manner and, after drying for 10 to 15 minutes, is steamed with steam at 101° to 103° C. After this fixing operation, the fabric is finished in the customary manner by rinsing with cold and warm water, soaping at the boiling point and rinsing again with water and subsequently drying. A deep brilliant blue print which has very good fastness to light and wet processing is obtained.

USE EXAMPLE 5

30 parts of the vinylsulfone dyestuff of Example 64 are dissolved in 200 parts of water at 70° C.; this solution is stirred into 500 parts of a neutral or weakly acid, 4% strength alginate thickener. This thickened dyestuff solution is made up to 1,000 parts with 270 parts of water. A mercerized cotton fabric is printed in the customary manner with the printing paste thus prepared and is then dried and, in order to fix the dyestuff, is passed through a hot aqueous fixing bath, at 90° to 105° C., which contains, in 1,000 parts of water, 100 parts of sodium chloride, 150 parts of anhydrous sodium carbonate, 50 parts of anhydrous potassium carbonate and 70 parts by volume of 33% strength aqueous sodium hydroxide solution. Fixing already takes place within a few seconds, so that the printed fabric can be passed through very rapidly. After this fixing treatment, the fabric is finished in the customary manner by rinsing with cold water, washing whilst hot, rinsing again with water and drying. A level, reddish-tinged blue printed pattern with very good fastness to light and wet processing is obtained.

USE EXAMPLE 6

An aqueous padding liquor which contains, per 1,000 parts by volume, 40 parts of the thiosulfatoethylsulfonyl dyestuff of Example 3, 100 parts of urea, 30 parts of anhydrous sodium sulfate and 16 parts by volume of aqueous 32.5% strength sodium hydroxide solution is prepared for dyeing a cotton fabric. The cotton fabric is padded at room temperature with a liquor pickup of 80% of the weight of the cotton fabric, wound onto a batching core, wrapped in a plastic film and left at room temperature for 24 hours. During this time, the dyestuff is fixed. After soaping and rinsing in the customary manner, a deep brilliant blue dyeing with good fastness to light and wet processing is obtained on the cotton fabric.

USE EXAMPLE 7

An aqueous dyebath which contains, dissolved in 2,000 parts by volume, 6 parts of the thiosulfatoethylsulfonyl dyestuff of Example 6, 10 parts of anhydrous sodium sulfate, 10 parts of anhydrous sodium carbonate and 4 parts by volume of 32.5% strength aqueous sodium hydroxide solution is prepared for dyeing a cotton fabric. 100 parts of a cotton fabric are introduced into this dyebath and are dyed at a temperature of 60° C. for between 60 and 90 minutes. After soaping and rinsing in the customary manner, a deep, brilliant blue dyeing with very good fastness to light and wet processing is obtained.

USE EXAMPLE 8

If one of the procedures described above is followed, according to the present invention, for dyeing and printing wool or synthetic polyamide materials or cellulose fiber materials, for example analogously to the above Use Examples 1 to 7, and one of the coppercomplex formazan dyestuffs, according to the invention, described in the preceding Examples 1 to 72 is employed, according to the invention, as the dyestuff, strong dyeings and prints with good fastness properties and the color shades given for these dyestuffs are likewise obtained.

We claim:

1. A copper formazan compound of formula (1):

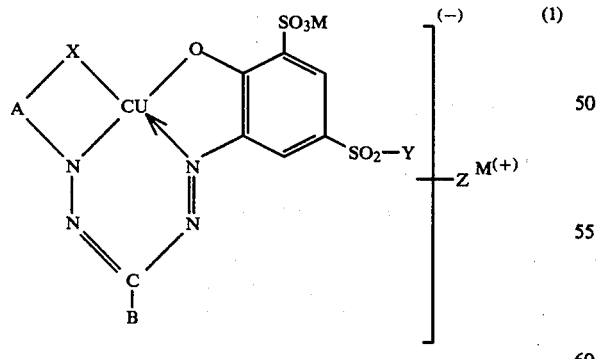

in which:

Z is a water-solubilizing group and a substituent on A and B or both, being imperatively present in the formazan molecule once, twice or three-times and being bonded to an aromatic carbon atom or an aliphatic carbon atom of A or B;

A is phenylene or naphthylene unsubstituted or substituted by substituents selected from the group consisting of halogen, nitro, alkyl of from 1 to 5 C-atoms, alkoxy of from 1 to 4 C-atoms, alkylsulfonyl of from 1 to 4 C-atoms, phenylsulfonyl, sulfamoyl and N-mono- and N,N-dialkyl-sulfamoyl with 1 to 4 C-atoms in each alkyl, and optionally substituted by Z as indicated above; B is a straight-chain or branched-chain alkyl group of from 1 to 8 C-atoms or a straight-chain or branched-chain alkenyl group of from 2 to 8 C-atoms, these alkyl and alkenyl groups are unsubstituted or substituted by phenyl or by phenyl substituted by substituents selected from the group consisting of methyl, ethyl, methoxy, ethoxy, fluorine, chlorine, bromine and sulfamoyl, or B is phenyl or naphthyl each unsubstituted or substituted by substituents selected from the group consisting of hydroxy, nitro, halogen, alkyl of from 1 to 5 C-atoms, alkoxy of from 1 to 4 C-atoms and carbalkoxy of from 2 to 5 C-atoms, or B is the monovalent radical of furan, thiophene, pyrrole, imidazole, indole, pyrazole, pyridine, pyrimidine, quinoline or benzimidazole, these heterocyclic radicals are unsubstituted or substituted on an aromatic carbon atom by chlorine, phenyl, methoxy, ethoxy, methyl or ethyl, and the hydrogen atoms in the NH groups of these heterocyclic rings may be replaced by methyl, ethyl or benzyl, and B is optionally substituted by Z as indicated above, or B is a hydrogen atom;

Cu is copper,

X is oxygen or carbonyloxy of the formula —CO—O—, each bonded to A in the ortho-position relative to the nitrogen atom on A, Y is vinyl or β-thiosulfatoethyl, and M is hydrogen or an equivalent of a metal.

2. A compound according to claim 1, of the formula:

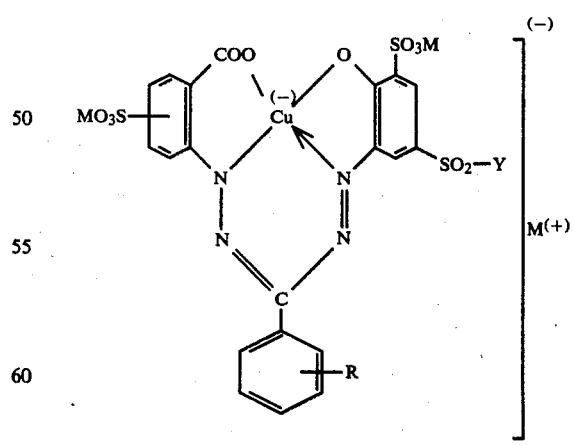

in which R is hydrogen or chlorine and M and Y are defined as in claim 1.

3. A compound according to claim 1, of the formula:

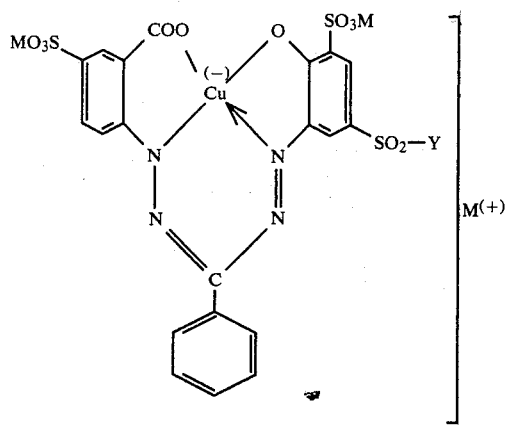
in which M and Y are defined as in claim 1.
4. A compound according to claim 1, of the formula:
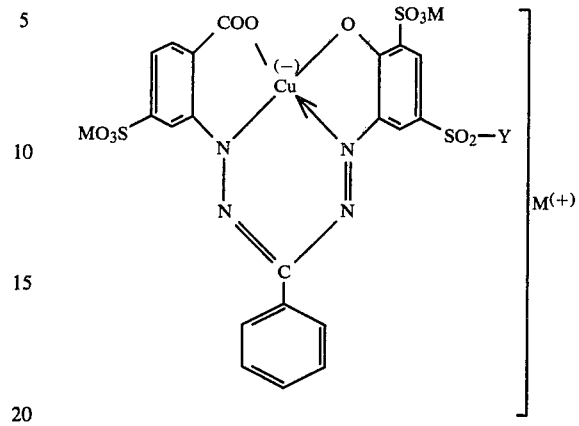
in which M and Y are defined as in claim 1.
* * * * *